United States Patent [19]

Schindler et al.

[11] Patent Number: 5,187,695
[45] Date of Patent: Feb. 16, 1993

[54] MULTIPLE COMPACT DISK PLAYER AND STORAGE DEVICE

[76] Inventors: Wolfgang Schindler, Wachterhofstr. 50, D-8011 Hohenkirchen; Peer Mietusch, Hauptstr. 110, D-8014 Neubiberg, both of Fed. Rep. of Germany

[21] Appl. No.: 711,471

[22] Filed: Jun. 5, 1991

[30] Foreign Application Priority Data

Jun. 5, 1990 [DE] Fed. Rep. of Germany ....... 4018018

[51] Int. Cl.⁵ .................. G11B 17/22; G11B 17/30; G11B 21/02
[52] U.S. Cl. ........................................ 369/37; 369/221
[58] Field of Search .................. 360/104, 106, 92; 369/37, 39, 77.2, 221

[56] References Cited

U.S. PATENT DOCUMENTS

| | | | |
|---|---|---|---|
| 4,791,626 | 12/1988 | Staar | 369/37 |
| 4,907,889 | 3/1990 | Simone | 360/92 |
| 4,984,228 | 1/1991 | Agostini | 369/37 |
| 5,031,164 | 7/1991 | Rockola et al. | 369/39 |
| 5,050,148 | 9/1991 | Simpson | 369/39 |
| 5,067,116 | 11/1991 | Kadrmas | 369/37 |

*Primary Examiner*—Eugene R. LaRoche
*Assistant Examiner*—Michael C. Kessell
*Attorney, Agent, or Firm*—Kirkpatrick & Lockhart

[57] ABSTRACT

A compact disk player for storing and playing a number of compact disks consists of an external housing, a storage magazine with a number of compartments into which the compact disks can be inserted individually, a scanner unit in which the information recorded on a compact disk in digital form can be scanned using a laser beam, and a transfer unit by means of which the compact disk located in a specified compartment of the storage magazine can be transported to the scanner unit. To achieve the fastest possible access time with a very compact construction, this invention requires a stationary configuration for the storage magazine while the scanner unit is designed so that it can move in relation to the storage magazine.

8 Claims, 3 Drawing Sheets

MULTIPLE COMPACT DISK PLAYER AND STORAGE DEVICE

BACKGROUND OF THE INVENTION

Field of the Invention

This invention relates to a compact disk player for storing and playing a number of compact disks.

In recent years, compact disk players have found very wide acceptance in the market for the reproduction of music, because the musical information is recorded on the disks on a digital basis, which means that even if the disks are played very frequently, a high sound quality is guaranteed without undesirable background noises.

Very high information densities can be achieved with such a digital recording process, so that the diameter of the compact disks can be kept very small compared to normal long-playing records. The small size of such compact disks, however, necessarily means that it takes a relatively long time to look for a certain compact disk if the listener has a relatively large collection of compact disks Apart from compact disk changers, into which five or ten compact disks can be inserted simultaneously, there currently exists only one compact disk player which has two tower-shaped magazines located next to one another, each of which holds 50 compact disks. Such a storage capacity, however, frequently proves insufficient, because record collectors nowadays already have collections of several hundred compact disks.

On the compact disk player of the prior art, it has also proven disadvantageous that individual compact disks can only be changed and replaced by removing one entire tower-like magazine from the compact disk player, and then manually replacing or inserting the new compact disks. Moreover, with the compact disk player of the prior art, the individual compact disks are also held inside the magazine by additional square plastic plates. The primary purpose of these square plastic plates is to make possible a smooth transfer of the compact disk in question between the magazine and the player unit.

Consequently, the object of this invention is to refine the compact disk player of the type described above so that a very large number of compact disks can be stored with an extremely compact construction, whereby a short transport path between the storage location in the magazine and the scanner unit makes very rapid access possible.

This object is achieved by the invention by means of the features disclosed in the characteristic portion of claim 1.

Advantageous refinements of the invention are disclosed in the subclaims.

SUMMARY OF THE INVENTION

The compact disk player according to the invention is designed so that, as a result of the geometric configuration of the magazine unit, a very large number of compact disks can be stored in it. The compact nature of the compact disk player thus guarantees that the player can be installed in a suitable location in a living room. As a result of the movement of the scanner unit in accordance with the invention along the stationary magazine unit, there are very short transport distances between the individual compartments of the magazine unit and the scanner unit, which makes possible extremely rapid access to the musical selections the listener wishes to hear. As a result of the compact disk insertion and removal specified by the present invention, moreover, the subsequent insertion of additional compact disks into the compact disk player and the possible replacement of compact disks already stored can be performed very easily. In the context of the remote control capability provided, moreover, automatic management of the compact disks stored becomes possible, as well as programming in any desired sequence, which significantly improves the ease of operation of the player in question. As a result of the connection of a PC computer or a pre-programmed memory module which becomes possible in the context of the present invention, search processes, programming strings of selections and editing processes can be performed very simply, so that the compact disk player according to the invention seems suitable not merely for use as a home player, but also as a professional player, e.g. in discotheques.

BRIEF DESCRIPTION OF THE DRAWINGS

The invention is explained and described below in greater detail with reference to the accompanying drawing, in which.

DETAILED DESCRIPTION OF THE PREFERRED EMBODIMENTS

Figure 1:
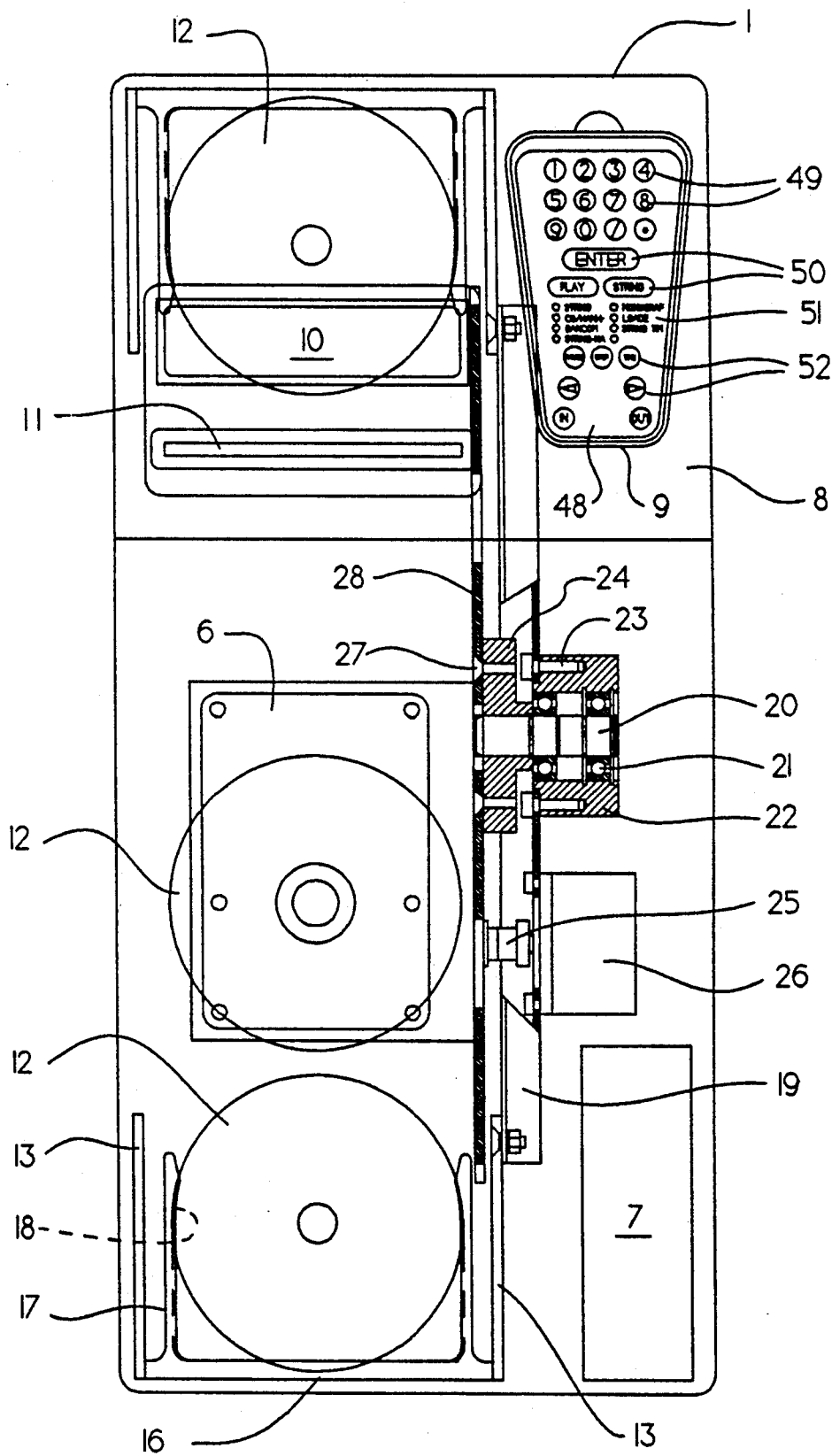
FIG. 1 shows a schematic head-on view, in partial cross section, of the compact disc player according to the invention.
Figure 2:
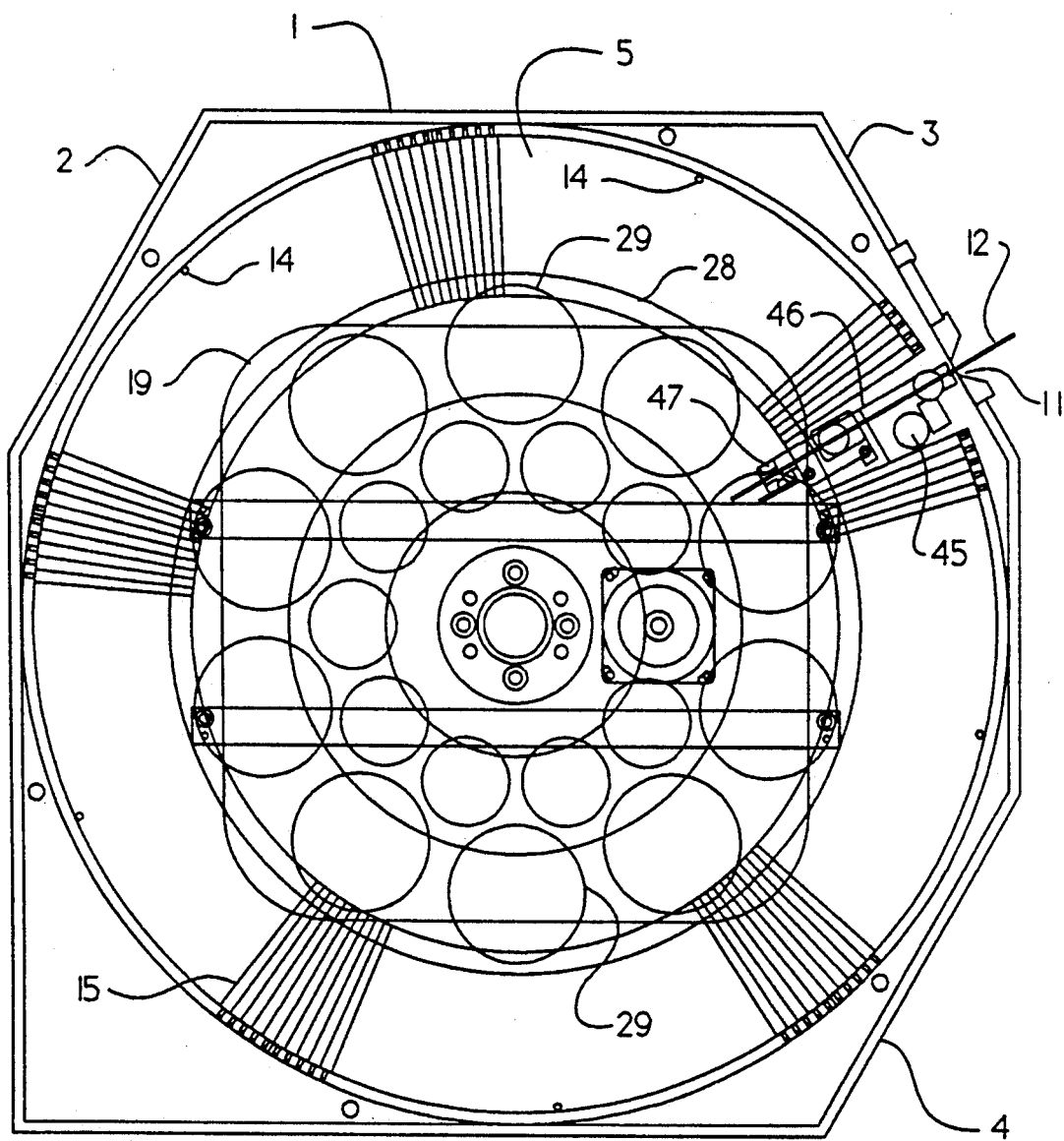
FIG. 2 shows a schematic side view of the compact disk player illustrated in FIG. 1.

As shown in FIGS. 1 and 2, the compact disk player according to the invention has an approximately square housing 1, which for aesthetic reasons has bevels 2 to 3 along its top rear edge, its top front edge and its bottom rear edge.

As shown in FIGS. 1 and 2, inside this rectangular housing 1 is a stationary ring-shaped storage magazine 5, a scanner unit 6 mounted so that it can rotate in the center of the ring-shaped storage magazine 5, and a signal processing unit 7 located to the lower right and indicated only schematically, which houses the electronic portion of the player. The rectangular housing 1, in its upper region, also has a compartment 8 into which a remote control unit 9 can be inserted. Alongside the compartment 8 for the remote control unit, the rectangular housing 1 has an optical display 10, and below that a slot 11 for the insertion and removal of compact discs 12.

As shown in FIGS. 1 and 2, the ring-shaped storage magazine 5 consists essentially of two base plates 13, each of which has a square opening. Between these two base plates, magazine segments 15 are held by means of pins 14. Each of these magazine segments 15 is used to hold 52 compact disks 12, and there are a total of five such magazine segments 15, which together form an essentially closed circle. The ring-shaped storage magazine with its five magazine segments 15, each with 52 disk positions, can consequently be used to hold 260 compact disks 12.

As shown in FIG. 1, the magazine segments 15 held between the two base plates 13 have an external wall 16, from which two elastic support arms 17 extend toward the center for each compact disk 12. Both the external wall 16 and the elastic support arms 17 are thereby provided with receptacle grooves 18, in which the outer circumference of the compact disk 12 in question comes to rest. The individual compact disks 12 are consequently each held at three points on their circumference inside the magazine segment 15.

As shown in FIG. 1, the base plate 13 located on the right side has a rectangular motor plate 19, which can also be seen in FIG. 2. This motor plate 19 has a hole in the vicinity of its center, through which a shaft 20 passes. This shaft 20 is mounted by means of two roller bearings 21 in a sleeve 22, which is fastened to the motor plate 19 by means of screws 23. The shaft 20, on its free end, has a toothed disk 24 which is engaged by means of a toothed belt (not shown) with a toothed belt pinion 25. This toothed belt pinion 25 thus forms a part of a stepper motor 26, which is fastened eccentrically on the motor plate 19. Finally, the toothed disc 24, by means of corresponding screws 27, supports a turntable 28 which is provided with a number of uniformly distributed circular holes 29 to reduce weight, as shown in FIG. 2.

This turntable 28, which can be made to rotate by means of the stepper motor 25, essentially supports three different units:

1. The scanner unit 6 illustrated in FIG. 1 with its support plate 30, on which the compact disk 12 being played comes to rest. Since this scanner unit 6 in itself is of the prior art and is not a part of the present invention, it is not necessary to explain this unit in any further detail.

2. A transfer sled 32 as shown in FIG. 3 which can be moved along two guide rods 31, and which is made to move back and forth along the two guide rods 31 by means of a toothed belt drive (not shown) and a direct current motor.

3. A pivoting arm 33, which when the transfer sled 32 is moved is pushed downward into the extreme left position, so that a magnetic pressure plate 34 located on the end of the pivoting arm 33 is guided toward the support table 30 of the scanner unit 6, so that the compact disk selected can be correctly centered.

Figure 3:
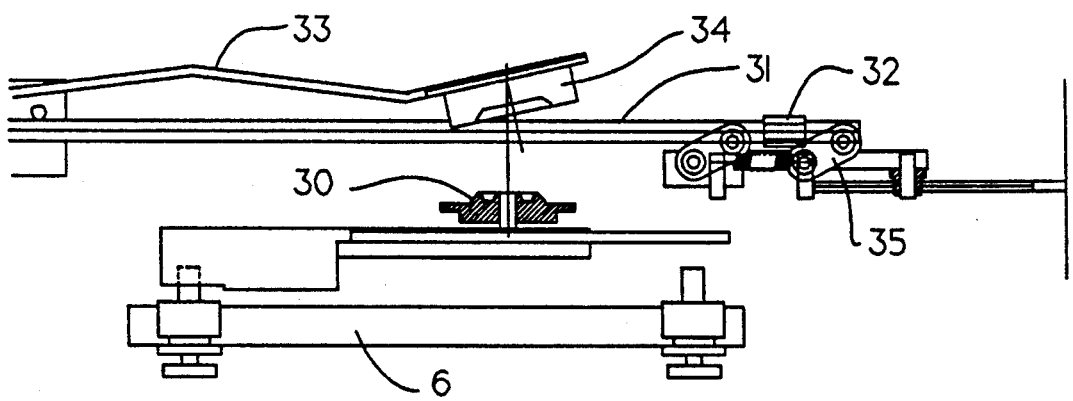
FIG. 3 shows a side view, in partial cross section, of the centrally-located scanner unit in connection with the necessary transfer unit of the compact disk player in FIGS. 1 and 2.
Figure 4:
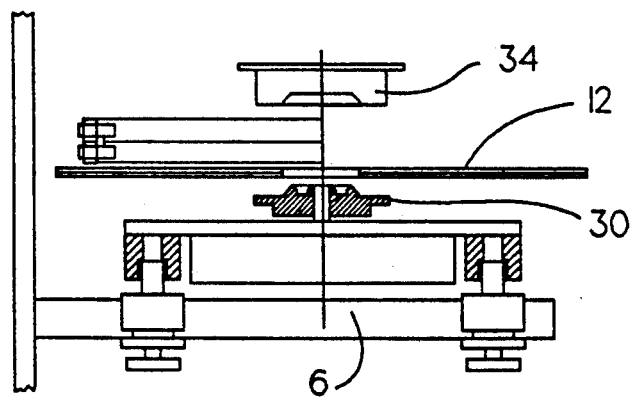
FIG. 4 shows an end view of the arrangement illustrated in FIG. 3.
Figure 5:
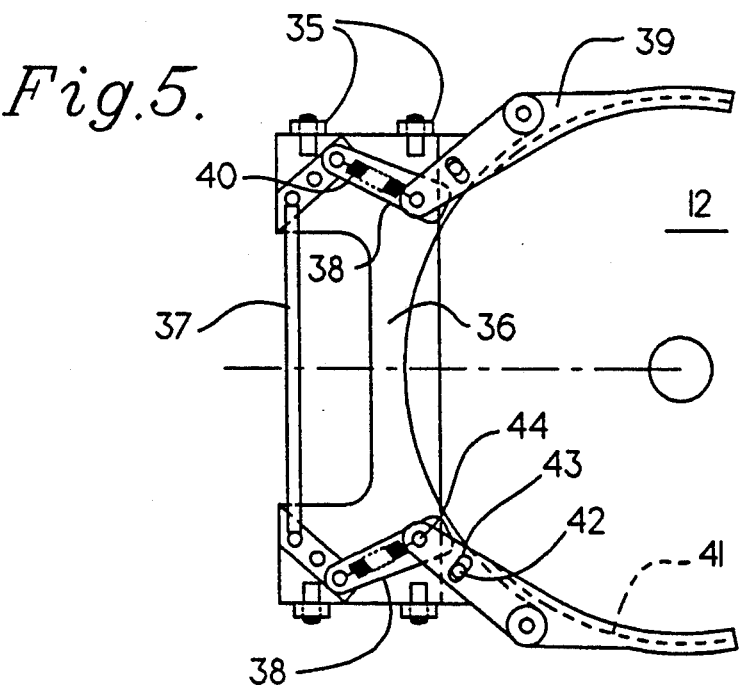
FIG. 5 shows a plan view of certain parts of the arrangement illustrated in FIGS. 3 and 4.

As shown in FIG. 3, the transfer sled 32, in the center toward the bottom, supports a parallelogram suspension 35 of a transfer arm 36 which, as shown in FIG. 5, has a trip rod 37 in its rear area. When the transfer sled 32 moves back along the guide rods 31 into the retracted position, which is shown on the left in FIG. 3, this trip rod 37 of the transfer arm 36 comes into contact with a stop (not shown), as a result of which the transfer arm 36 suspended by means of the parallelogram suspension 35 is pushed downward against the force of a tension spring (not shown), so that the transfer arm 36 is lowered.

As shown in FIG. 5, the transfer arm 36 has two divergent, fork-shaped, extensions 38, on whose ends two holding fingers 39 are mounted so that they can pivot. On the rearward-projecting ends of these holding fingers 39 are suspended corresponding tension springs 40, which pull the free ends of the holding fingers 39 toward one another. These free ends of the holding fingers 39 are provided with corresponding grooves 41, which are used to hold the outer circumference of a compact disk 12. The front ends of these holding fingers 39 are thereby designed so that when the transfer sled 32 is moved into the position shown on the right in FIG. 3, these free ends become engaged with corresponding diagonal surfaces of the corresponding support arms 17 of the magazine segments 15, so that the holding arms 17 in question are pushed outward, releasing the compact disk 12, while simultaneously the holding fingers 39, which are linked so that they can pivot on the transfer arm 36, grasp the compact disk 12 in question. The pivoting range of the two holding fingers 39 is thereby defined by means of pins 42 fastened to the transfer arm 36 and which project into corresponding longitudinal holes 43 bored into the holding fingers 39. The pins 44 located on the rear end of the holding fingers 39, which are used for the suspension of the tension springs 40, are also extended upward. The free ends of these pins 44 thereby form stops which, when the transfer sled 32 is moved back along the guide rods 31 into the position shown on the left in FIG. 3, trigger a controlled pivoting of the holding fingers 39, so that when the compact disk 12 is in the position for playing, the free ends of the holding fingers 39 are released from the compact disk 12 in question.

As shown in FIG. 2, in the vicinity of the slot 11 used to insert and remove compact disks 12, there is a transport unit 46 equipped with a direct current motor 45, by means of which individual compact disks 12 can be inserted by 60% of the disk diameter, or which are ejected outward through the slot 11. The activation of the direct current motor 45 thereby takes place as a function of the photoelectric barriers 47 present, which are located in the area of movement of the compact disc 12 being moved through the slot 11 Since the design of this transport unit 6 itself is of the prior art, there is no need to describe it in further detail here.

The signal processing unit 7 located in the lower right-hand corner of FIG. 1, in addition to the analog and digital circuits of the scanner unit 6, contains the entire electronic control system for the compact disk player. This electronic control system thereby includes an electronic memory which, among other things, is used to manage the storage positions of the compact disks 12 inside the ring-shaped storage magazine 5 with its 260 storage positions. The storage management is thereby accomplished on one hand by means of the stepper motor 26, which reports to the electronic memory the storage position of the ring-shaped storage magazine 5 in which a new compact disk 12 has been inserted, or the position from which the compact disk 12 in question has been removed. There is also a safety control in connection with a sensor, which is carried along by the rotation of the turntable 28, and thereby detects the position of the holding arms 17 projecting from the external walls 16 of the magazine segments 15. The memory in question is also powered by means of a storage battery, so that even if there are rather long interruptions in the power supply, the data stored in the electronic memory will not be lost.

The remote control unit 9 inserted in the compartment 8, but which can be removed at any time, also has a storage battery which, when the remote control unit 9 is inserted, is charged by the compact disk player by means of corresponding contacts. This remote control unit 9 is connected to the compact disk player by means of an infrared system, so that it can be operated from any desired location.

The remote control unit 9 has a top cover plate 48 which has a number of input keys and indicator lamps It includes the following operating elements Input keys 49 designated by the symbols "1" to "0" for inputing the storage position of a desired compact disc 12, and then selecting the desired musical selection on the compact disk 12 in question Input keys 50 designated "Enter", "Play" and "String", by means of which the input process is controlled, whereby this input process can either be used directly to play a selection or to define a pre-programmed sequence for playing musical selections. The electronic memory provided in the signal processing unit 7 is thereby designed so that a maximum possible 99 different play programs, each containing 99 different selections, can be stored in it. These different play programs are called "strings", so that access to these play programs is accomplished by pressing the correspondingly labelled key.

Indicator lamps arranged in two rows, by means of which the current operating mode is always displayed. The indicator lamps 51 located on the left side thereby show the various operating modes when musical selections are being played, while the indicator lamps 51 on the right side are used for various operating modes during programming.

Finally, in the lower region of the top cover plate 48 of the remote control unit 9, there are input keys 52 which are designated "Pause, "Stop", "Time", arrows indicating left and right, and "In" and "Out". The input keys 52 designated by arrows are thereby used for a search process within an existing play program, while the input keys 52 designated "In" and "Out" are used to control the insertion and removal of compact disks 12 into and out of the ring-shaped storage magazine 5.

The compact disk player is equipped with a standard RS 232 serial interface, by means of which it can be connected to a PC computer or a pre-programmed memory module. When a PC computer is connected, the keyboard can be used to input the title information of the compact disks 12 stored in the compact disk player, so that the PC computer can be used to perform search functions, to form strings, to perform editing functions, etc. When the PC computer is connected to the compact disk player, the selection of the musical selections to be played by the compact disk player can be made from the PC computer, by listing certain musical selections identified by specified criteria on the screen of the PC computer. The desired musical selection can be identified by means of the mouse, and can be played by pressing an appropriate key. The operation of the compact disc player in this case is completely within the capabilities of the PC computer, so that the PC computer acts as the control unit for the compact disk player. The electronic system provided inside the signal processing unit 7 is thereby designed so that a maximum of nine compact disk players can be controlled from a single PC computer, so that such a system, in connection with a PC computer, seems very well suited for use in discotheques. In this manner, it is possible to achieve fully automatic access to several thousand compact disks 12, without having to manually handle individual compact disks 12.

The compact disk player according to the invention is also equipped with a card index or an index book, in which the liner inserts of the compact disks 12 stored in the storage magazine 5 can be kept. These liner inserts, which are inserted in the compact disk boxes in which the compact disks 12 are sold, contain the basic information on the musical selections included on the disk, together with the individual playing times. When newly-acquired compact disks 12 are introduced into the slot 11 used for insertion and ejection, the storage position indicated on the optical display 10 would then be manually entered on the corresponding liner insert, so that by means of the card file or file book, the corresponding storage position inside the storage magazine 5 can be determined very rapidly.

The operation of the compact disk player according to the invention will be explained below in the case of a simple play procedure: If it has been determined on the basis of the existing card file or file book that the desired musical selection is the third piece on a given compact disk 12 which is located in storage position 125 of the ring-shaped storage magazine 5, then on the top cover plate 48 of the remote control unit 9, the input keys 49 identified by the symbols "1", "2", "5", "/" and "3" must be operated first. In order then, the input key 50 designated "Enter" must be operated, and then finally the input key 50 designated "Play" must be pushed. As a result of the activation of these input keys 49 and 50, the electronic control system in the signal processing units 7 is activated, so that the stepper motor 26 moves the turntable 28 into a position which corresponds to the storage position 125 of the ring-shaped storage magazine 5. The transfer sled 32 with its transfer arm 36 is thereby moved to the right, as shown in FIG. 3, until the free ends of the holding fingers 39 shown in FIG. 5 grasp the compact disc 12 located in storage position 125 on the outer circumference of the disk, while simultaneously the holding arms 17 of the corresponding magazine segment 15 are spread apart, so that the compact disc 12 is released from the storage magazine 5. In the order indicated below, the transfer sled 32, as shown in FIG. 3, is moved to the left until the center point of the compact disc 12 in question comes to rest above the axis of the support table 30 of the scanner unit 6. On account of contact between the trip rod 37 on the transfer arm 36 and a stop (not shown), the transfer arm 36 suspended by means of the parallelogram suspension 35 on the transfer sled 32 is pushed downward against the force of a tension spring (not shown), so that as desired, the compact disk 12 is lowered onto the support plate 30 of the scanner unit 6. The pins 24 provided in the rear area of the holding fingers 39 are also pushed together by engagement with a stop against the force of the tensile springs 40, so that the compact disk 12 held in the grooves 41 of the holding fingers 39 is released. Finally, again by means of an additional stop, the pivoting arm 33 is pivoted downward, so that the magnetic pressure plate 34 located on the end of the pivoting arm 33 comes to rest, with a simultaneous centering of the compact disc 12 on the support table 30 of the scanner unit 6. By means of the electronic control system inside the signal processing unit, in the following order, the stepper motor 26 is reactivated and the scanner unit 6 is moved into a horizontal position, so that in this position a scanning of the compact disc 12 in question can be performed. The scanner unit 6 is thereby activated by the electronic control system so that, as specified, the third musical selection on the compact disk 12 is played. After this musical selection on the compact disc 12 has been played, the compact disk 12 is transported back into the storage position 112, from which compact disk 12 had previously been removed. This return is performed in a manner corresponding to the manner in which the disk was previously removed from the storage magazine 5.

If a string play program is sued, the various compact disks 12 are moved as specified by the program. It should be noted, however, that in this case, the control of the compact disk player is fully automatic, corresponding to the preprogramming selected.

It should be noted that various alternatives are possible in the context of the present invention. For example, it is possible to have several magazine towers arranged in pairs, between which the existing scanner unit is moved up and down in the vertical direction, so that very brief access times can be achieved with a compact construction.

What is claimed is:

1. Compact disk player for storing and playing a number of compact disks, consisting of an external housing, a stationary storage magazine with a number of compartments into which the compact disks can be individually inserted, said storage magazine designed in the form of a torus and including two base plates between which individual magazine segments are clamped by means of pins, a motor plate fastened to one of said base plates and holding an eccentrically located stepper motor and a shaft, a toothed disk supported by said shaft and driven by said stepper motor by means of a toothed belt, a turntable provided with circular holes and fastened to said toothed disk, a scanner unit in which the information recorded in digital form on a compact disk can be scanned using a laser beam pivotally mounted in a center area of said storage magazine and supported by said turntable, a transfer unit by means of which the compact disk located in a specified compartment of said storage magazine can be transported to said scanner unit wherein said transfer unit includes two guide rods supported by said turntable along which a transfer sled can be moved and a transfer arm with two pivoting holding fingers suspended by a parallelogram suspension means from said transfer sled, the free ends of said holding fingers having grooves in which the compact disks to be transferred are held at two points of their outer circumference, and means for moving said scanner unit in relation to said storage magazine.

2. Compact disk player according to claim 1, characterized by the fact that the individual magazine segments each have an external wall from which elastic holding arms extend toward the center, whereby both the external walls and the holding arms projecting from them have receptacle grooves on the inside, which grooves are used to hold individual compact disks at three points on their circumference.

3. Compact disk player according to claim 1, characterized by the fact that the turntable additionally supports a pivoting arm, the free end of which is used to hold a magnetic pressure plate.

4. Compact disk player according to claim 1, characterized by the fact that in the upper region of the approximately square housing there is a slot used for the insertion and removal of compact disks, in the vicinity of which there is a transport unit equipped with a direct current motor, by means of which compact disks can be transported into the player or out of it, as a function of a control using photoelectric barriers.

5. Compact disk player according to claim 1, characterized by the fact that in the upper region of the square housing there is an optical display and a compartment to hold an infrared-operated remote control unit, while in the lower region of the square housing there is a signal processing unit, from which the entire signal processing and activation of the compact disk player is performed.

6. Compact disk player according to claim 5, characterized by the fact that the signal processing unit is provided with an electronic memory, by means of which the occupied storage spaces in the storage magazine are controlled and desired sequences of disks and tracks on disks can be played.

7. Compact disk player according to claim 5 characterized by the fact that the signal processing unit has an external interface which allows a computer and/or a pre-programmed storage module to be connected thereto.

8. Compact disk player according to claim 7, characterized by the fact that the signal processing unit in connection with the external interface is configured so that several compact disk players can be connected to a single computer, forming a centrally-controlled group of compact disk players.

* * * * *

UNITED STATES PATENT AND TRADEMARK OFFICE
CERTIFICATE OF CORRECTION

PATENT NO. : 5,187,695
DATED : February 16, 1993
INVENTOR(S) : Wolfgang Schindler and Peer Mietusch It is certified that error appears in the above-identified patent and that said Letters Patent is hereby corrected as shown below:

Col. 3, line 32, delete "25" and substitute therefor --26--.

Col. 5, line 22, after "lamps", insert --are--.

Col. 5, line 31, delete ""Pause," and substitute therefor --"Pause",--.

Signed and Sealed this

Sixteenth Day of November, 1993

Attest:

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,187,695
DATED : February 16, 1993
INVENTOR(S) : Wolfgang Schindler and Peer Mietusch It is certified that error appears in the above-identified patent and that said Letters Patent is hereby corrected as shown below:

Col. 2, line 26, after "which", insert --:--.

Col. 4, line 37, after "11", insert --.--.

Col. 5, line 4, after "lamps", insert --.--.

Col. 5, line 5, after "elements", insert --:--.

Col. 5, line 9, after "question", insert --.--.

Col. 7, line 5, delete "sued" and substitute therefor --used--.

Signed and Sealed this

Twenty-first Day of December, 1993

Attest:

BRUCE LEHMAN

*Attesting Officer*     *Commissioner of Patents and Trademarks*